United States Patent [19]

Hoffmann

[11] 4,258,948
[45] Mar. 31, 1981

[54] ROOFER'S BUNDLE TOOL

[76] Inventor: Thomas M. Hoffmann, 665 Stagg La., Santa Cruz, Calif. 95062

[21] Appl. No.: 68,169

[22] Filed: Aug. 20, 1979

[51] Int. Cl.³ ............................................... B65G 7/12
[52] U.S. Cl. ..................................................... 294/26
[58] Field of Search ..................... 294/26, 27 H, 31.2, 294/25, 26.5, 27 R, 32, 34; 224/45 R, 45 D, 45 P, 45 T, 45 W

[56] References Cited

U.S. PATENT DOCUMENTS

| | | | |
|---|---|---|---|
| 1,207,367 | 12/1916 | Baswell | 294/26 |
| 1,855,678 | 4/1932 | Jensen | 294/26 |
| 2,632,772 | 12/1952 | Johnson | 294/26 |
| 2,772,111 | 11/1956 | Eide | 294/26 |

*Primary Examiner*—James B. Marbert
*Attorney, Agent, or Firm*—Paul L. Hickman

[57] ABSTRACT

A tool is disclosed for lifting and carrying a bundle of shakes or shingles by hooking onto the band of material that holds the bundle together. The tool includes a handle and at least two hooks attached to the handle for engaging the band of the bundle. The handle is designed to prevent the skinning of a roofer's knuckles or the pinching of his fingers by providing adequate separation between a grip portion of the handle and a portion of the handle that supports the hooks. The hooks include offsets which help align the tool with the center of gravity of the bundle and may be provided with gaffs to ease their insertion under the band. In certain embodiments of this invention the handle is modified to provide a sharp cutting edge for puncturing, chopping or slicing through the band.

8 Claims, 9 Drawing Figures

U.S. Patent  Mar. 31, 1981  4,258,948
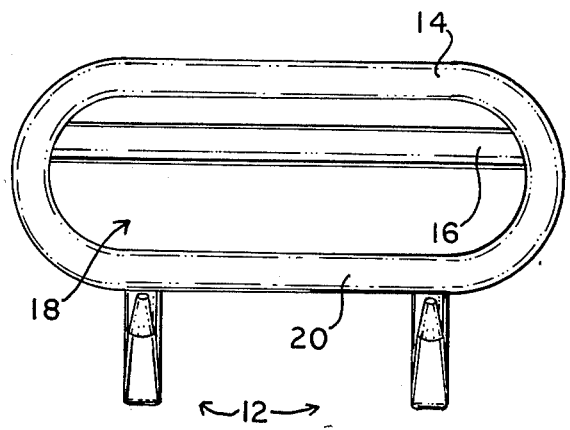
FIG. 1
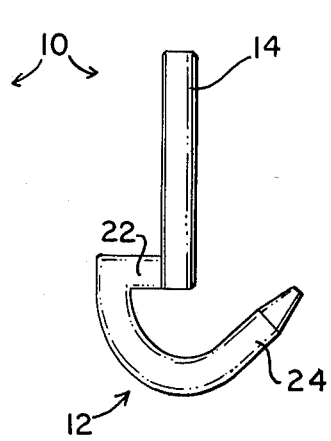
FIG. 2
FIG. 3
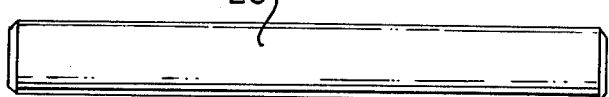
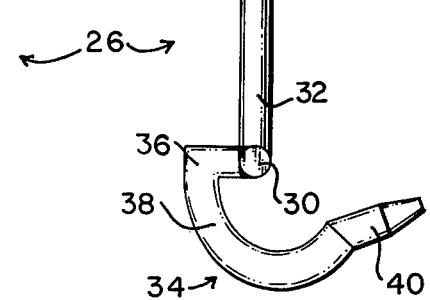
FIG. 4
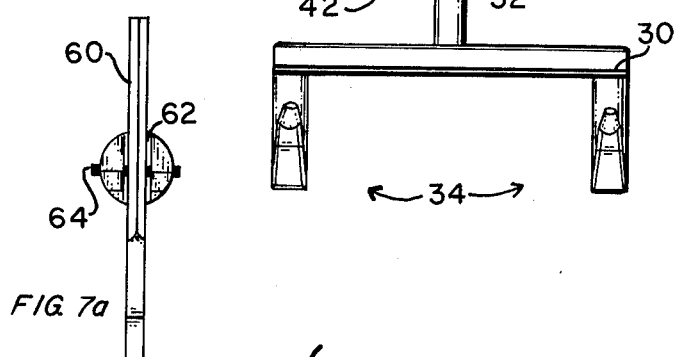
FIG. 7a
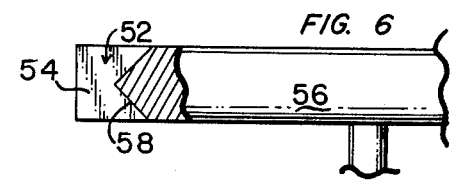
FIG. 6
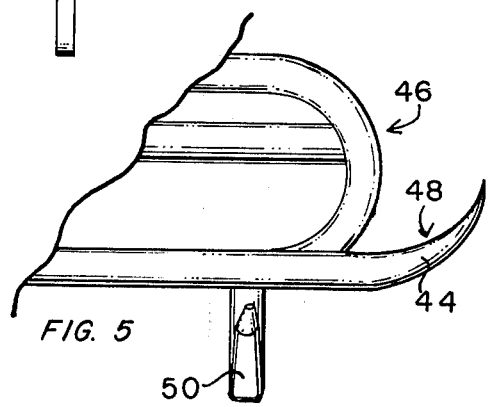
FIG. 5
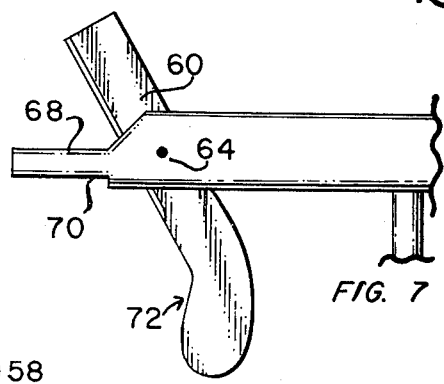
FIG. 7
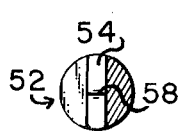
FIG. 6a

ROOFER'S BUNDLE TOOL

BACKGROUND OF THE INVENTION

1. Field of the Invention

This invention relates generally to hand tools, and more particularly to grappling hooks and the like that can be used for lifting heavy bales and/or bundles of material.

2. Description of the Prior Art

One handed grappling hooks of various kinds have been known in the prior art. For instance, there is the hay bale grappler which basically includes a handle provided with one or more elongated hooks. The hooks are plunged deep within a bale of hay so that the curved end portions of the hooks engage the tough, fibrous mass of hay compacted therein. The bale of hay can then be lifted, hauled and thrown about with much greater ease than would otherwise be possible.

While grappling hooks are known, a tool adequately designed to lift heavy bundles of roofer's shingles and shakes is not known. Until this time the roofer was forced to lift and carry a bundle of shakes or shingles by holding onto the thin metal or plastic retainment band that surrounds the middle of the bundle. Since a wet bundle of shakes or shingles can weigh over a hundred pounds, and since well over a hundred bundles may be needed to roof an average residential home, it may be appreciated that such a method of handling bundles constitutes painful and exhausting work.

Another problem plaguing the roofer is how to remove the retainment band from the bundle of shakes or shingles. Traditionally, a roofer's hatchet was used to chop through the band, although nowadays sheet metal snippers are more commonly used since staple guns have largely replaced the roofing hatchet. If a hatchet is used on the band, it quickly becomes dulled and therefore useless for other purposes, such as trimming the shingles. Either way, a special tool is required which costs money and which can lead to aggravation when it is lost or misplaced.

What the prior art lacks, then, is a roofer's bundle tool which is designed and engineered to quickly, easily and efficiently carry about a bundle of shakes or shingles and, if desired, cut the band off of the bundle.

SUMMARY OF THE INVENTION

It is an object of this invention to provide a tool that a roofer can use to quickly, easily and painlessly lift and carry a bundle of shakes or shingles.

It is another object of this invention to provide such a tool which further is capable of cutting the retainment band from the bundle.

A further object of this invention is to provide a tool in accordance with the above objects which is rugged and longlasting in construction and which further is relatively inexpensive to manufacture.

Briefly, the invention comprises an elongated handle including a hand grip portion and a hook support portion, and a pair of parallel, spaced apart hooks, where each hook has an offset portion attached at an angle to the hook support portion of the handle and a long, curved portion attached to the offset portion that is adapted to engage the retainment band of a bundle of shakes or shingles. In more than one embodiment of this invention, an integrally formed part of the handle means functions as a band cutter and a roofing felt cutter.

An advantage of this invention is that the handle is designed to protect the hand and knuckles of a roofer from becoming skinned or pinched against the bundle of shakes or shingles.

Another advantage of this invention is that the offset portion of the two hooks balances the load on the tool to minimize the effort required to carry a bundle.

Still a further advantage of this invention is that its double hook design prevents a bundle from twisting as it is being carried.

The tool is further advantageous in that its cutter can cut a retainment band off of a bundle of shingles or shakes.

These and other objects and advantages of the present invention will no doubt become apparent upon a reading of the following description as accompanied by the several figures of the drawing.

BRIEF DESCRIPTION OF THE DRAWING

FIG. 1 is a front elevational view of a ROOFER'S BUNDLE TOOL in accordance with the present invention.

FIG. 2 is a side elevational view of the tool shown in FIG. 1.

FIG. 3 is a front elevational view of an alternate embodiment of a ROOFER'S BUNDLE TOOL, illustrating a different type of handle, and a pair of hooks provided with an outwardly extending gaff.

FIG. 4 is a side elevational view of the tool shown in FIG. 3.

FIG. 5 is a partially broken elevational view illustrating an arcuately shaped cutter used for slicing through the retainment band of a bundle of shakes or shingles.

FIGS. 6 and 6a are front and side elevational views, respectively, of another type of retainment band cutter that is formed as an integral part of the tool's handle.

FIGS. 7 and 7a are again front and side elevational views respectively, of yet another embodiment for a retainment band cutter.

DETAILED DESCRIPTION OF THE PREFERRED EMBODIMENTS

Referring to FIGS. 1 and 2, a ROOFER'S BUNDLE TOOL includes a handle 10 and a pair of hooks 12 attached to the handle. In this embodiment, the handle is of a generally circularly oblong shape and includes an outer perimeter portion 4 and a cross-bar portion 16. As best seen in FIG. 2, portions 14 and 16 are substantially co-planar and are preferably aligned with the lowest part of hook portion 12 for reasons to be discussed subsequently.

FIG. 1 clearly indicates that cross bar 16 is disposed closer to the top of outer perimeter portion 14 than to the bottom. Such an arrangement provides a strong secure grip portion for a roofer's hand, prevents the rotation of the tool in his hand and provides a protected space 18 for his fingers. This separation between the grip portion of the handle and a hook support portion 20 of the handle is designed to prevent the barking of a roofer's knuckles or the pinching of his fingers as hooks 12 are slid under the retainment band of a bundle of shakes or shingles. However, the separation is kept within limits so that the roofer's elbow does not have to be unduly bent to keep the bundle off of the ground.

As seen in FIG. 2, hooks 12 are generally "C" shaped and each include an offset portion 22 and a long, curved portion 24 which terminates in a bluntly conical tip. The hooks are rigidly attached to the hook support portion of the handle. preferably by a suitable welding technique.

In use, cross-bar 16 and the top part of outer perimeter portion 14 are grasped by the roofer's hand so that his fingers and knuckles are protected within area 18. The hooks are then slipped under the band of a bundle of shakes or shingles and rotated until the tool's handle is substantially perpendicular to the bundle. When in this position, the handle is aligned with the center of gravity of the bundle so that it becomes a well balanced, easily carried load. The aforementioned conically tapered tips ease the insertion of the hooks under the retainment band of the bundle.

When not in use, the ROOFER'S BUNDLE TOOL can be worn on a roofer's belt, or stored in a pocket. The tool can also be provided with a special belt clip (not shown) which may more conveniently attach the tool to a belt.

In FIGS. 3 and 4, an alternate embodiment of a ROOFER'S BUNDLE TOOL is shown to include a handle 26 having a grip portion 28, a hook support portion 30, and a connection bar 32 which couples the grip portion to the hook support portion. A pair of hooks 34 each include an offset portion 36 and a curved portion 38 which extends from the offset portion back through an imaginary plane defined by the portions of handle 26. In this embodiment, an end section 40 of portions 38 projects outwardly from the handle to form a gaff, for reasons to be explained subsequently.

The use of the ROOFER'S BUNDLE TOOL of FIGS. 3 and 4 is quite similar to that of the previously discussed embodiment. A roofer grasps grip portion 28 so that his fingers and knuckles are safely protected in an area 42. The hooks are then placed under the band of a bundle of shakes or shingles. The gaff formed at end sections 40 aids in the initial engagement of the hooks with the band of a bundle since the handle portions can remain in a more vertical position during the engagement process.

In FIG. 5, a band cutter 44 is shown to be formed as an integral part of a handle 46 and comprises a curved extension of material formed and machined to provide a hard, sharp cutting edge along its upper surface 48. In use, the cutting edge of the band cutter is slipped under the band of the bundle so that a hook 50 of the ROOFER'S BUNDLE TOOL rests on top of the shakes or shingles. The tool is then pivoted, using hook 50 as a fulcrum, so as to force the cutting edge of the band cutter against the retainment band with a slicing-type motion. The band cutter 44 also has other uses, such as scribing a shake or shingle prior to cutting it for placement along a ridge or hip of a roof.

In FIG. 6, another band cutter 52 is shown, this one being adapted for a ROOFER'S BUNDLE TOOL of the type shown in FIGS. 3 and 4. In this embodiment, a notched slot 54 is formed inwardly from one end of a grip portion 56 so as to form a cutting edge 58. The band of a bundle is then cut by inserting an edge of the band within slot 54 and pressing it against cutting edge 58.

In FIGS. 7 and 7a, another type of band cutter is shown to include a shearing blade 60 held within a longitudinal slot 62 by a pivot pin 64. The end of a grip portion 66 is machined to form flattened surfaces 68 and 70 which allow the end of the grip portion to be easily slipped under the band of a bundle. The band is then cut by pulling on the finger portion 72 of shearing blade 60 to cause the blade to shear through the band.

While this invention has been discussed in the terms of a few preferred embodiments, it is contemplated that various modifications thereof will become apparent to those reading the preceding description. For instance, the materials of construction for the tool can be many, although stainless steel is presently preferred. Further, there are many different types of band cutter, handle and hook designs which are bona fide embodiments of this invention.

It is therefore intended that the following appended claims be interpreted as including all such modifications as fall within the true spirit and scope of this invention.

What is claimed is:

1. A ROOFER'S BUNDLE TOOL comprising: elongated handle means including
    a grip portion, and
    a hook support portion coupled to said grip portion and spaced therefrom sufficiently to permit a roofer's fingers and knuckles to fit between said grip portion and said hook support portion, said grip portion and said hook support portion lying within a common plane; and
hook means including at least two spaced apart hooks, each hook having
    an offset portion extending angularly from said plane and having a first end attached to said hook support portion, and
    an elongated arcuate portion having a first end coupled to a second end of said offset portion, said arcuate portion extending through said plane and terminating at a second end in a bluntly conical tip, a section of the arcuate portion being bent away from said plane to form a gaff.

2. A tool as recited in claim 1 wherein
said handle means comprises an oblong perimeter portion lying within said plane and an elongated cross-bar portion attached to said perimeter portion and lying within the area of said plane surrounded by said perimeter portion, said cross-bar portion being attached to an off-center section of said perimeter portion, where the section of said perimeter portion distal from said cross-bar portion defines said hook support portion.

3. A tool as recited in claim 2 wherein
said cutter means includes an arcuate extension of said perimeter portion, said extension being provided with a cutting edge adapted to slice through said band.

4. A ROOFER'S BUNDLE TOOL comprising: handle means including
    a first elongated bar,
    a second elongated bar lying within a plane common to said first elongated bar, and
    a third elongated bar lying within said plane and having one end attached to said first bar and the other end attached to said second bar; and
hook means including at least two spaced apart hooks, each hook having
    an offset portion extending angularly from said plane and having a first end attached to said third elongated bar, and
    an elongated arcuate portion having a first end coupled to a second end of said offset portion, said arcuate portion extending through said plane and terminating at a second end in a bluntly conical tip.

5. A tool as recited in claim 4 wherein a section of the arcuate portion of said hooks proximate a second end are bent away from said plane to form a gaff.

6. A tool as recited in claim 4 wherein said handle means includes a cutter means for cutting the band of material that holds a bundle of shakes or shingles together.

7. A tool as recited in claim 6 wherein said cutter means includes a cutter edge formed within a slot extending inwardly from an end of said first bar.

8. A tool as recited in claim 6 wherein said cutter means includes a shearing blade pivotally attached within a longitudinal slot formed inwardly from an end of said first bar.

* * * * *